Aug. 11, 1953
D. A. JONAS
2,648,074
HOOKED FASTENER AND CONNECTION FOR
RAILS USED FOR BEDS OR DIVANS
Filed Jan. 27, 1948
2 Sheets-Sheet 1
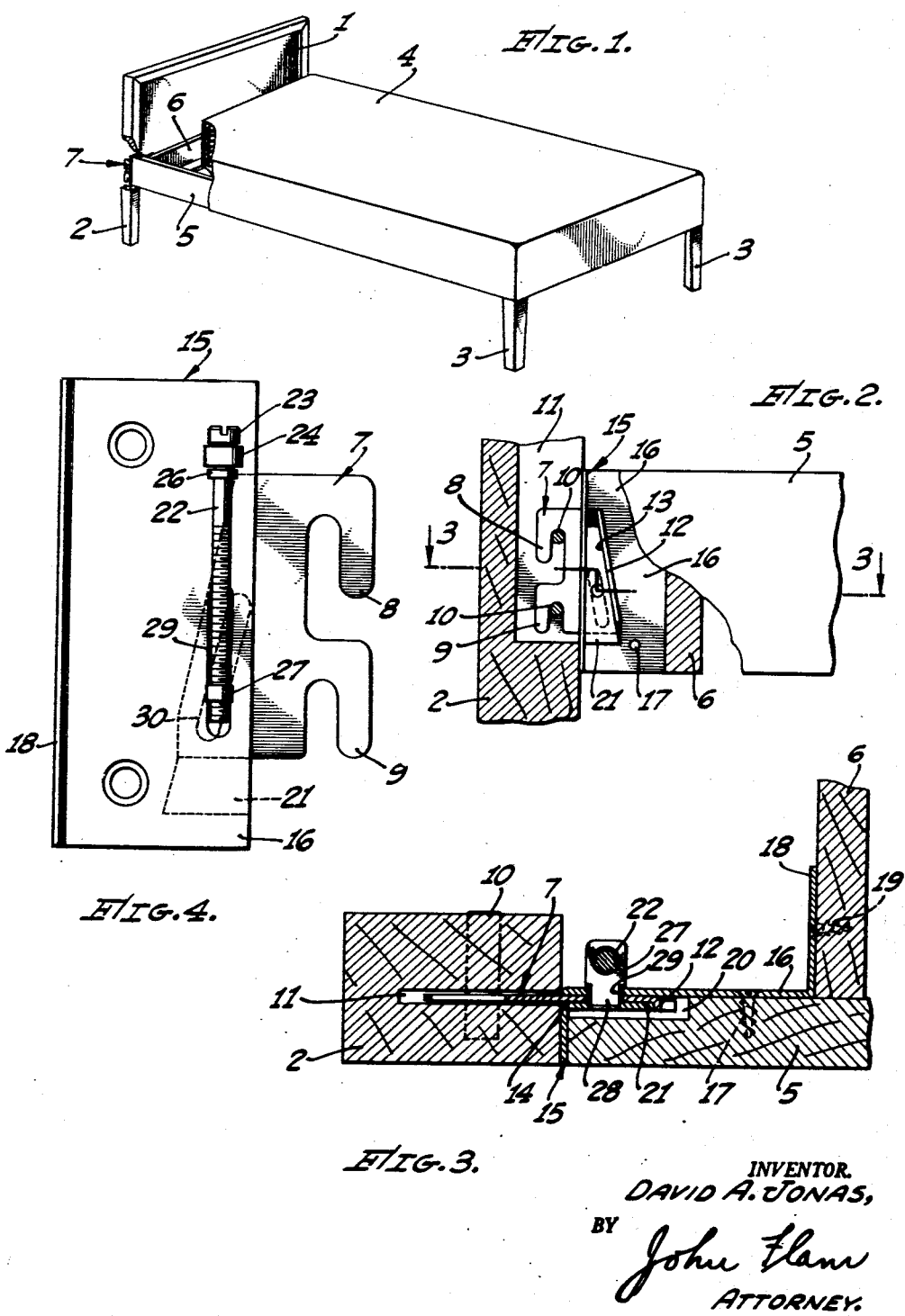
INVENTOR.
DAVID A. JONAS,
BY John Flann
ATTORNEY.

Aug. 11, 1953   D. A. JONAS   2,648,074
HOOKED FASTENER AND CONNECTION FOR
RAILS USED FOR BEDS OR DIVANS
Filed Jan. 27, 1948   2 Sheets-Sheet 2
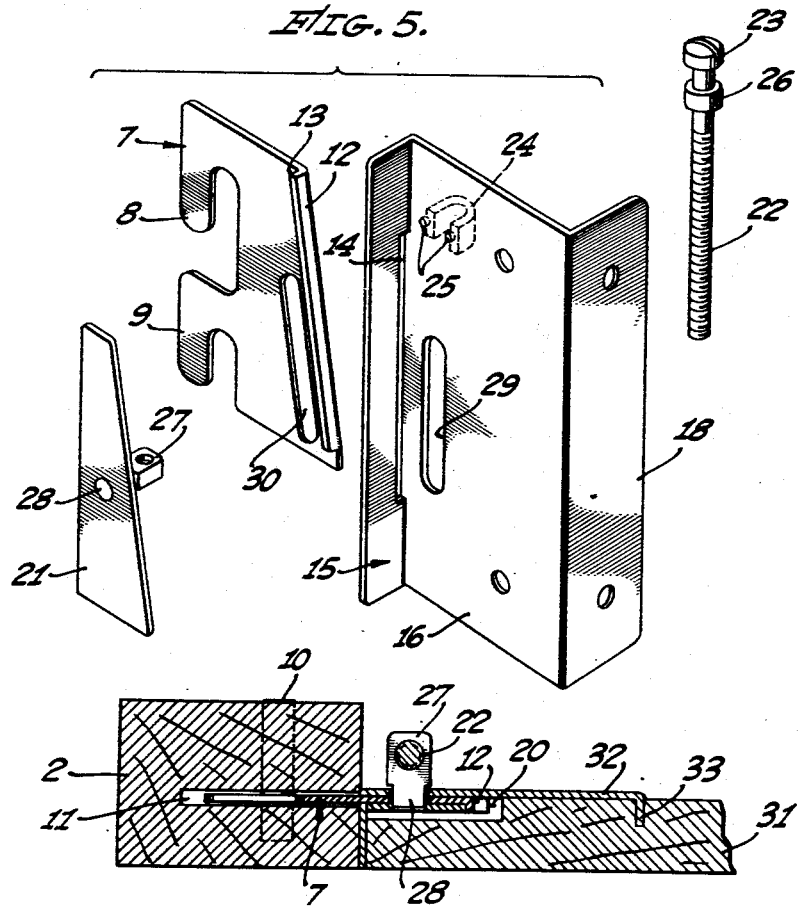
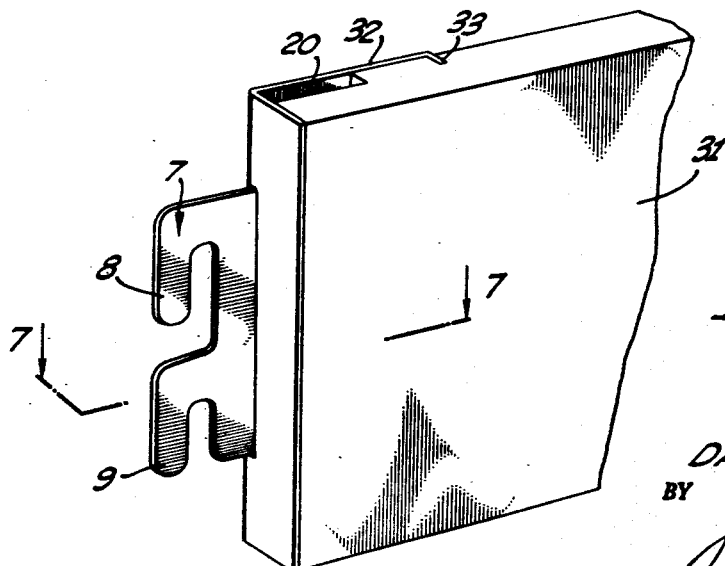
INVENTOR.
DAVID A. JONAS,
BY John Flam
ATTORNEY.

Patented Aug. 11, 1953

2,648,074

UNITED STATES PATENT OFFICE 2,648,074

HOOKED FASTENER AND CONNECTION FOR RAILS USED FOR BEDS OR DIVANS

David A. Jonas, Los Angeles, Calif.

Application January 27, 1948, Serial No. 4,577

8 Claims. (Cl. 5—296)

This invention relates to clamps or fasteners for firmly holding the side rails of a bedstead or divan in proper relation to a headboard or footboard.

In order to support a spring on a bedstead or the frame of a divan, use is made of side rails extending lengthwise of the bed or divan. When wooden headboards or footboards are used, the corner posts of the bed form a part of the board, and it has been common to join the side rail to the post by one or more hooks carried at the end of the rail, which engage a pin or pins extending transversely across a slot formed in the post.

It is one of the objects of this invention to improve in general, connections of this character. Side rail connections often become loosened under the continual stresses imposed thereon. While it has been possible in the past to tighten these connections, such tightening is difficult because the parts required to be manipulated are not conveniently located. It is another object of this invention to make it possible to tighten the connections in a simple and easy manner, as by the aid of a screw driver manipulated from above the rails. Similarly, removal of the side rail by loosening the connections, is also facilitated.

It is still another object of this invention to provide a connection means that is compact, and yet resists all normal bending stresses.

In furtherance of the objects of this invention, the hook member is so arranged that it is adjustable for tightening and loosening the connection, in a direction parallel to the length of the rail, without any vertical movement. By this arrangement, the side rails stay at a constant level in the process of tightening or loosening the connection. Therefore, as in connection with divans, the upholstery covering portions of the side rail and the posts is never disturbed when it is required to take up any minor play in the connection.

This invention possesses many other advantages, and has other objects which may be made more clearly apparent from a consideration of several embodiments of the invention. For this purpose there are shown a few forms in the drawings accompanying and forming part of the present specification. The forms will now be described in detail illustrating the general principles of the invention; but it is to be understood that this detailed description is not to be taken in a limiting sense, since the scope of this invention is best defined by the appended claims.

Referring to the drawings:

Figure 1 is a pictorial view, partly broken away, of a divan in which the invention is embodied;

Fig. 2 is a sectional view illustrating the connection between the bed post and the side rail;

Fig. 3 is a sectional view, taken along a plane corresponding to line 3—3 of Fig. 2;

Fig. 4 is an elevation of the connector mechanism;

Fig. 5 is an exploded pictorial view of the connector mechanism;

Fig. 6 is an enlarged pictorial view of a modified form of connector shown in conjunction with a side rail; and Fig. 7 is a sectional view, taken along a plane corresponding to line 7—7 of Fig. 6.

In the present instance, there is shown a head board 1 (Fig. 1) having corner posts 2. Footposts 3 are also illustrated, and which serve to support a spring structure 4. The spring structure 4 is also supported by the aid of the side rails 5 and an end rail 6. This end rail 6, as shown most clearly in Figs. 1 and 3, is spaced slightly forward of the post 2. Upholstery usually is provided in divans of this type to form a cover for the spring structure 4, as well as for the side rails 5.

Each of the rails 5 is provided with a hook member 7. This hook member 7 is provided with downwardly extending hooks 8 and 9 (Figs. 2 and 4) adapted to engage in a normal manner with the transverse pins 10. These pins 10 extend tranversely across a narrow longitudinal slot 11 formed in the post 2.

The hook member 7 may conveniently be formed of sheet metal. As shown most clearly in Figs. 2, 3, and 5, the inner edge of the sheet metal is bent at right angles to form a slanting flange 12. This flange 12 thus forms an inclined surface 13 extending tranversely of the rail 5. The purpose of this slanting surface will be hereinafter described.

The hook member 7 extends through a slot 14 formed in the sheet metal member 15 that extends over the end of the rail 5. This member 15 is formed integrally with the bracket 16 that is fastened, as by the aid of screws 17, to the inner side of the rail 5. The member 15 and bracket 16 form a guide for hook member 7. This bracket also has another flange 18 projecting inwardly of rail 5. To this flange is fastened the end rail 6, as by the aid of the screws 19.

As shown most clearly in Fig. 3, the flange 12 and the inner end of hook member 7 can be conveniently located in a recess 20 formed on the inner side of the rail 5.

Hook member 7 is adjustable longitudinally of the side rail 5 in order to urge the end of the side rail tightly against the vertical surface of post 2. This is accomplished by the aid of a wedge 21 (Figs. 2, 3, and 5). This wedge is also made of sheet metal, and it has a vertical side which engages the inner surface of the member 15. Its sloping side engages the sloping surface 13 of flange 12. By upward movement of this wedge, as viewed in Fig. 2, the side rail 5 is urged toward the left and into firm contact with the post 2.

Operation of the wedge is accomplished by the aid of a screw 22 which extends upwardly and on the inner side of the rail 5. This screw 22 has a slotted head 23 for ready manipulation by a screw driver. It is journalled in the bearing 24, joined as by the aid of pins 25 (Fig. 5) to the member 16. A collar 26, fastened to the screw 22 and spaced below the head 23, prevents axial movement of the screw.

This screw engages a nut 27 attached to the wedge 21 as by the aid of a shank 28. This shank 28 is appropriately joined to the wedge 21 by riveting over the end of the shank 28. Shank 28 also projects through a vertical slot 29 formed in the member 16. An opening 30 is also formed in the hook member 7 to pass the shank 28. This opening may be a large clearance opening if desired; but, in the present instance, it is shown as a slanting slot, the axis of the opening being parallel with the surface 13.

Manipulation of the wedge 21 is readily effected by the aid of a screw-driver extending downwardly near the inner corner formed between post 2 and the rail 5. By turning the screw 22, the wedge 21 may be pulled upwardly to tighten the device; or screw 22 may be turned so as to move the wedge 21 downwardly to loosen the device.

In attaching the side rail 5 to the corner post 2, the wedge 21 is first lowered. Then the hook member 7 may be inserted into the slot 11 to engage the pins 10. Then the screw 23 may be manipulated to pull the wedge upwardly and thereby to urge the side rail 5 tightly into contact with the post 2. This simple manipulation merely causes relative movement between the hook member 7 and the side rail 5 in a horizontal direction. Accordingly, there is no variation in the level of the side rail 5 in the process of tightening or loosening the coupling. Therefore, upholstery or covering materials can be used over the side rails, as well as over the posts if desired, without danger of displacing or injuring the upholstery. If, on continued use, the rail should become loose, it is a simple matter to tighten the screw 22 and bring the side rail 5 again into tight contact with the corner post.

In the form just described, the flange 18 of the member 16 is used to support an end rail 6. In ordinary beds, such end rails are not used. In the form of Figs. 6 and 7, adapted for such beds, the side rail 31 is shown supporting the hook member 7 as in the first form. The member 32, shaped generally the same as member 16, is utilized. In place of the flange 18, a flange 33 is provided, which engages in a vertical slot in the side rail 31. In other respects, the mechanism is identical with that shown in the first form.

The inventor claims:

1. In a fastener for attaching a side rail to a bed post: a bracket adapted to be attached to the side rail, said bracket having a lateral apertured flange adapted to fit over the end of said rail; a hook member having parallel top and bottom edges guided by the top and bottom edges of the aperture in said bracket for adjustment in a direction substantially parallel to the said edges; a wedge movable in a direction transverse to that of the hook member, and engaging the same, for urging the hook member inwardly of the side rail; and a screw connected to the wedge for moving the same.

2. In a fastener for attaching a side rail to a bed post: a movable hook member having top and bottom edges; guide means having a lateral apertured flange, and adapted to be fastened to the side rail, said hook member extending through the aperture in the flange for movement transverse to said flange; said hook member having a portion defining, with said flange, a pair of opposed converging surfaces; a wedge having converging edges engaging said surfaces and movable in a direction substantially perpendicular to said edges; and a screw connected to the wedge for moving the same.

3. In a fastener for attaching a side rail to a bed post: a guide member adapted to be attached to the side rail and having an extension adapted to overlie the end thereof, there being a guiding slot in said member; a hook member guided in said slot for movement in a direction transverse to said extension; said hook member having a surface opposed to the inner surface of the said extension, said two surfaces being converging; and a wedge engaging said surfaces and movable in a direction perpendicular to the direction of movement of the hook member.

4. In a fastener for attaching a side rail to a bed post; a guide member adapted to be attached to the side rail and having an extension adapted to overlie the end thereof, there being a guiding slot in said member; a hook member guided in said slot for movement in a direction transverse to said extension; said hook member having a surface opposed to the inner surface of the said extension, said two surfaces being converging; a wedge engaging said surfaces and movable in a direction perpendicular to the direction of movement of the hook member; a nut carried by the wedge member; and a screw rotatably supported by the guide member and engaging the nut for moving said wedge.

5. In a fastener for attaching a side rail to a bed post: a hook member; a member adapted to be secured to said rail and forming a guide for said hook member for limiting movement of the hook member to a linear direction, said guide member having a slot extending substantially perpendicularly to the direction of said movement, and said hook member having a slot inclined with respect to said guide slot and overlying said guide slot; a shank member extending through the slots, a nut carried at one end of said shank member; and a screw engaging said nut for moving the shank member in a direction along the guide slot.

6. In combination: a post having a pair of spaced pins; a hook member engaging said pins at one end of the hook member, said hook member having a pair of substantially parallel edges, said hook member having a flange at the other end of said hook member providing a surface inclined with respect to said edges, and having a slot substantially parallel to said inclined surface; a side rail; a guide secured to said side rail and by contacting said edges adapted to guide said hook member for longitudinal movement only relative to said guide, said guide having an apertured flange extending laterally of said hook member, which extends through the apertured flange and is guided thereby, said guide having a slot extending substantially parallel to said apertured guide flange; a wedge member engaging the flange of said hook member and the flange of said guide member; and means for moving said wedge member and for thereby moving said hook member longitudinally of said guide, including a shank member carried by said wedge member, said shank member extending through each of said slots, threaded means carried by said shank member, and a screw engaging said threaded means.

7. In combination: a side rail; a post member; means defining a recess in said side rail adjacent one end thereof, including a member secured to said rail and having an extension fitting over the end of said rail, said extension having a slot extending substantially perpendicular to the longitudinal direction of said rail; a post engaging member having top and bottom parallel edges guided by the walls of said slot for movement only longitudinally of said rail, said post engaging member having a flange at one end thereof inclined with respect to said edges and received in said recess for providing a surface opposed to the inner surface of said extension, said surfaces being converging; and a wedge member within said recess and engaging said surfaces and movable with respect to said surfaces.

8. In combination: a side rail; a post member; means defining a recess in said side rail adjacent one end thereof, including a member secured to said rail and having an extension fitting over the end of said rail, said extension having a slot extending substantially perpendicular to the longitudinal direction of said rail; a post engaging member having top and bottom parallel edges guided by the walls of said slot for movement only longitudinally of said rail, said post engaging member having a flange at one end thereof inclined with respect to said edges and received in said recess for providing a surface opposed to the inner surface of said extension, said surfaces being converging; a wedge member within said recess and engaging said surfaces; a nut carried by the wedge member; and a screw rotatably connected to said rail and engaging said nut for moving the wedge member.

DAVID A. JONAS.

References Cited in the file of this patent

UNITED STATES PATENTS

| Number | Name | Date |
|---|---|---|
| 108,472 | Gilbert | Oct. 18, 1870 |
| 270,051 | Goebel | Jan. 2, 1883 |
| 2,227,704 | Collins | Jan. 7, 1941 |

FOREIGN PATENTS

| Number | Country | Date |
|---|---|---|
| 87,856 | Germany | Aug. 28, 1896 |